(12) United States Patent
Yamaguchi

(10) Patent No.: US 6,499,055 B1
(45) Date of Patent: Dec. 24, 2002

(54) COMMUNICATION APPARATUS AND METHOD

(75) Inventor: Shoichi Yamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/248,892

(22) Filed: Feb. 12, 1999

(30) Foreign Application Priority Data

Feb. 17, 1998 (JP) ............................................. 10-035079

(51) Int. Cl.[7] .............................................. G06F 15/16
(52) U.S. Cl. ..................................................... 709/206
(58) Field of Search ................................. 709/206, 207, 709/227, 223, 240, 217; 395/200; 707/3; 345/335

(56) References Cited

U.S. PATENT DOCUMENTS

| | | | | |
|---|---|---|---|---|
| 5,592,303 A | | 1/1997 | Yamaguchi | 358/435 |
| 5,802,304 A | * | 9/1998 | Stone | 395/200.57 |
| 5,905,495 A | * | 5/1999 | Tanaka | 345/335 |
| 6,067,561 A | * | 5/2000 | Dillon | 709/206 |
| 6,138,146 A | * | 10/2000 | Moon et al. | 709/206 |
| 6,145,002 A | * | 11/2000 | Srinivasan | 709/225 |
| 6,185,551 B1 | * | 2/2001 | Birrell et al. | 707/3 |
| 6,199,106 B1 | * | 3/2001 | Shaw | 709/217 |

OTHER PUBLICATIONS

Mosher, Sue, Microsoft exchange user's handbook. 1997, Duke Press p. 298.*

* cited by examiner

Primary Examiner—Zarni Maung
Assistant Examiner—Kimberly Flynn
(74) Attorney, Agent, or Firm—Fitzpatrick, Cella, Harper & Scinto

(57) ABSTRACT

If e-mail awaiting transmission from a client such as a personal computer or workstation exists when a connection has been made from a dial-up server such as an Internet service provider to the Internet via a PSTN or ISDN, the e-mail is transmitted to a mail server on the Internet. If e-mail to the client exists in a mail server on the Internet, this e-mail is received and then forwarded.

9 Claims, 3 Drawing Sheets

COMMUNICATION APPARATUS AND METHOD

BACKGROUND OF THE INVENTION

This invention relates to a communication apparatus having a dial-up connection to the Internet via a network for providing a client with electronic mail and viewing of Web pages on the Internet, as well as to a method of such communication.

A method using a dial-up router is available as a method of connecting a terminal device, which has been connected to a local area network (LAN), to a network such as the Internet via a public network (PSTN/ISDN).

In a case where a terminal in the LAN uses a dial-up router to access the device of another party not included in the LAN, the dial-up router recognizes destination information such as an IP address from data output by the terminal and dials the public network automatically to make the connection to the other party's device.

In a case where a terminal in the LAN is to view a Web page on the Internet, the dial-up router recognizes a datagram that carries a data request from the terminal. If a connection to a public network has not been made, the dial-up router makes the connection at such time.

In a case where Internet e-mail is to be sent, the dial-up router recognizes a datagram that carries the destination of the predesignated mail server and effects a dial-up connection from the public network in a manner similar to that mentioned above. If e-mail is received from a mail server, then the dial-up router makes the connection in like fashion.

In the example of the prior art described above, a connection to the public network is made whenever a Web page is viewed from each terminal in the LAN and whenever e-mail is sent or received by each terminal. As a result, a billing charge is made is made each time.

SUMMARY OF THE INVENTION

Accordingly, an object of the present invention is to provide a communication apparatus and method in which when a connection is made to the Internet via a network, the efficiency with which the network is utilized is improved by implementing e-mail store-and-forward.

According to the pre sent invention, the foregoing object is attained by providing a communication apparatus for making a dial-up connection to the Internet via a network to provide a client with e-mail and viewing of Web pages on the Internet, comprising: interface means for connecting a plurality of clients; dial-up connection means for making a dial-up connection to the Internet; and e-mail processing means for storing and forwarding e-mail, the e-mail processing means storing and forwarding e-mail when the connection to the Internet has been made by the dial-up connection means.

Further, according to the present invention, the foregoing object is attained by providing a communication method using a communication apparatus for making a dial-up connection to the Internet via a network to provide a client with e-mail and viewing of Web pages on the Internet, comprising the steps of: transmitting e-mail to a mail server on the Internet in a case where e-mail waiting to be transmitted from the client exists when a dial-up connection has been made to the Internet; and receiving and forwarding, from a mail server on the Internet, e-mail to the client.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

An embodiment of the present invention will now be described in detail with reference to the drawings.

Figure 1:
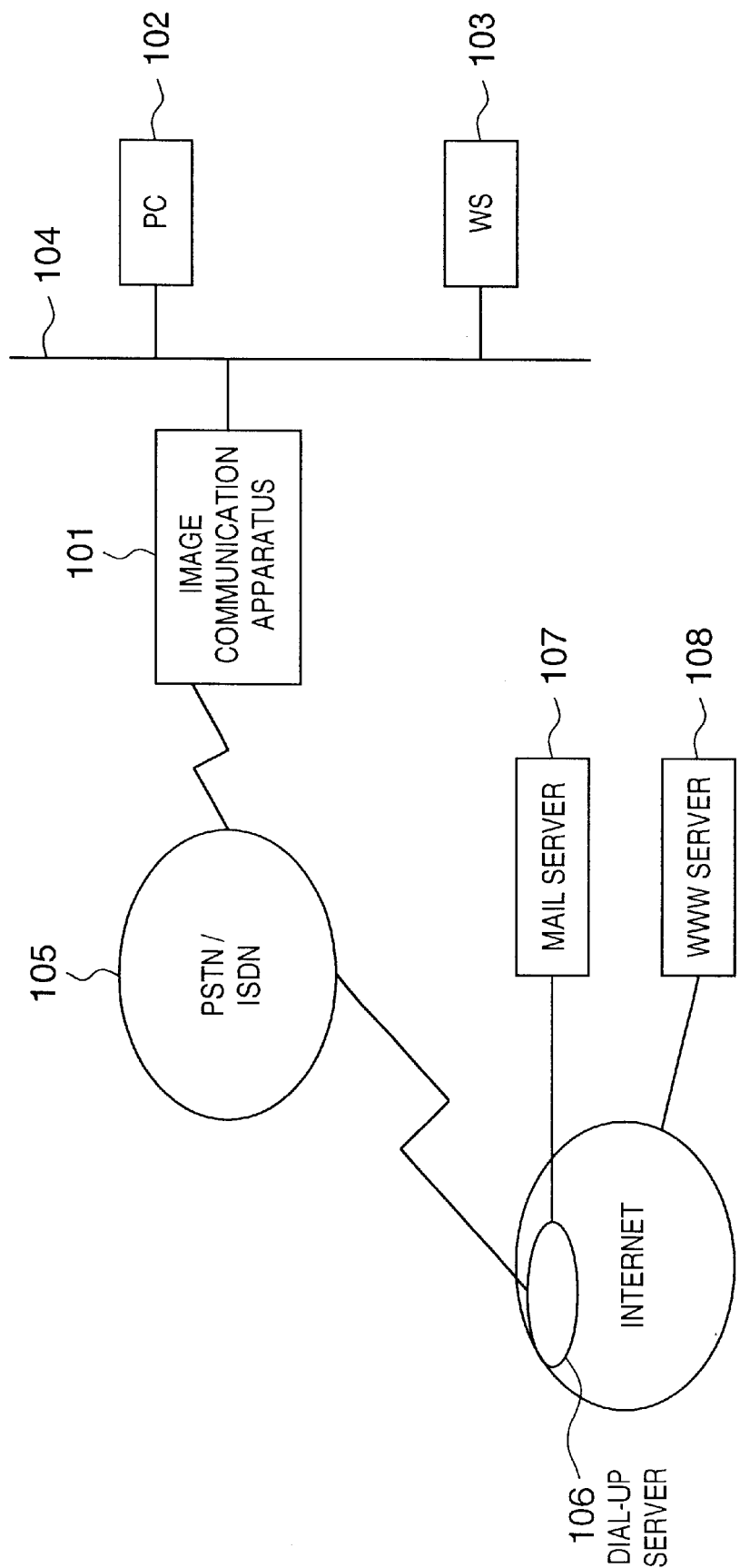
FIG. 1 is schematic view showing a network system which includes an image communication apparatus.

FIG. 1 is schematic view showing a network system which includes an image communication apparatus 101 connected to a LAN and public network, described later. A personal computer (PC) 102 and a workstation (WS) 103 are capable of viewing e-mail and pages on the WWW (World-Wide Web). A LAN (Local Area Network) 104 connects the image communication apparatus 101, the personal computer 102 and the workstation 103, etc. A public network 105 is a PSTN or ISDN, etc. A dial-up server 106, such as an Internet Service Provider, provides an Internet connection service. A mail server 107 stores e-mail to be stored and forwarded. The mail server 107 is a mail server of a domain to which the image communication apparatus 101 belongs, and the client sends e-mail to and receives e-mail from the mail server 107. Numeral 108 denotes a WWW server, a number of which are included on the Internet. Text files described in HTML and files such as image, voice and video files are present in the WWW server 108, which has a function for reading out these files and transferring them to the client in response to a request from a WWW browser.

Figure 2:
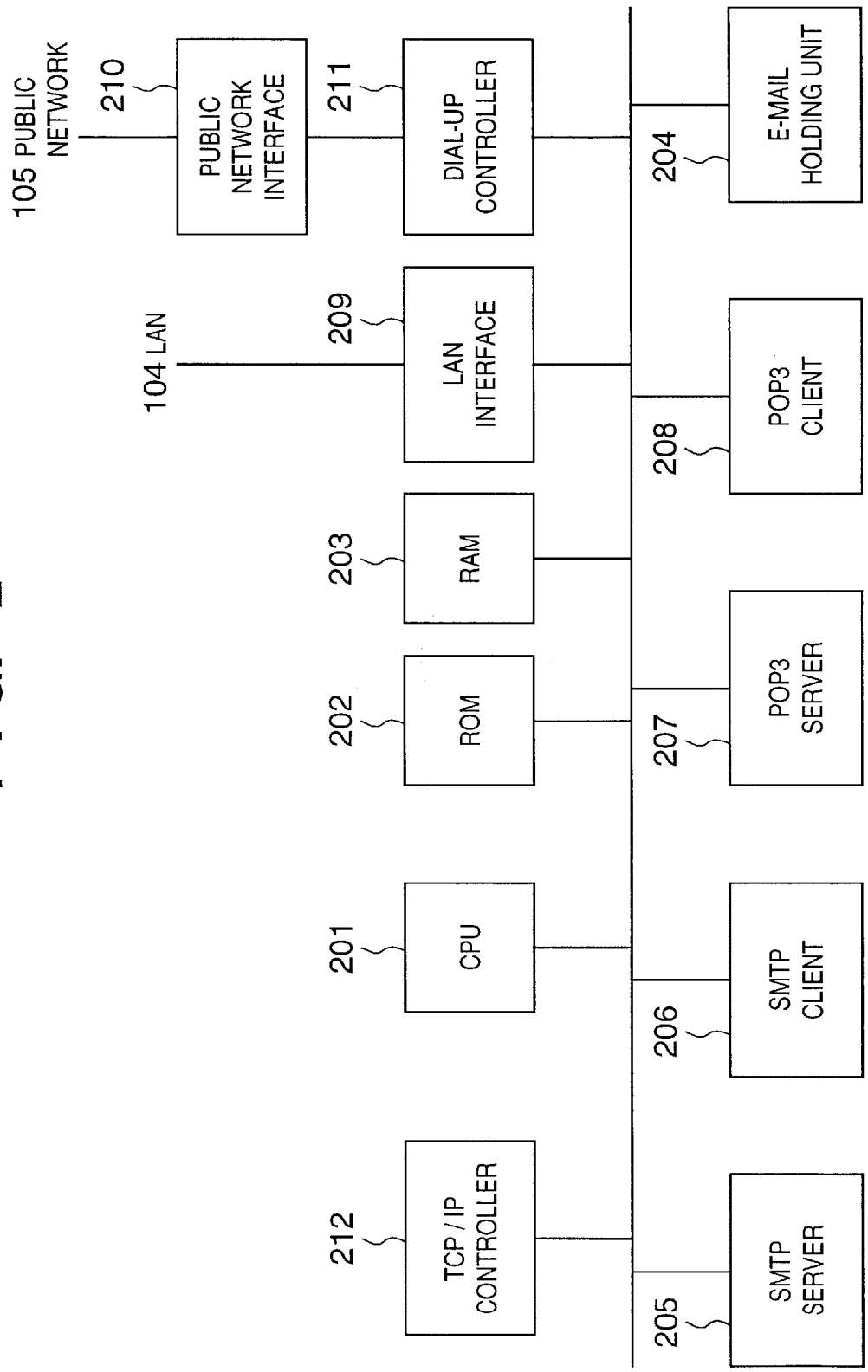
FIG. 2 is a block diagram showing the construction of the image communication apparatus depicted in FIG. 1.

FIG. 2 is a block diagram showing the construction of the image communication apparatus 101 depicted in FIG. 1. The apparatus includes a CPU 201 for controlling the overall apparatus; a ROM 202 serving as a memory for storing control programs of the CPU 201 and various control data; a RAM 203, which is a memory having a working area used when the CPU 210 executes processing, various tables and program control variables; an e-mail holding unit 204 for temporarily holding e-mail stored and forwarded via the LAN 104 or public network 105; an SMTP (Simple Mail Transfer Protocol) server 205 in which SMTP is installed to provide an e-mail transfer service to an SMTP client inside and outside the apparatus; an SMTP client 206, which requests an SMTP server inside and outside the apparatus for transmission of e-mail; a POP3 server 207 in which a POP (Post Office Protocol) 3 is installed to provide an e-mail transfer service to a POP3 client inside and outside the apparatus; a POP3 client 208, which requests transfer of e-mail saved in a mail box of the POP3 server inside and outside the apparatus; a LAN interface 209, which uses a TCP/IP (Transmission Control Protocol/Internet Protocol) as its protocol; a public network interface 210 for connection to a PSTN, ISDN or the like; a dial-up controller 211 for transmitting an IP datagram using a communication protocol such as a PPP (Point-to-Point protocol); and a TCP/IP controller 212 in which the TCP/IP, which is the Internet standard, has been installed.

Figure 3:
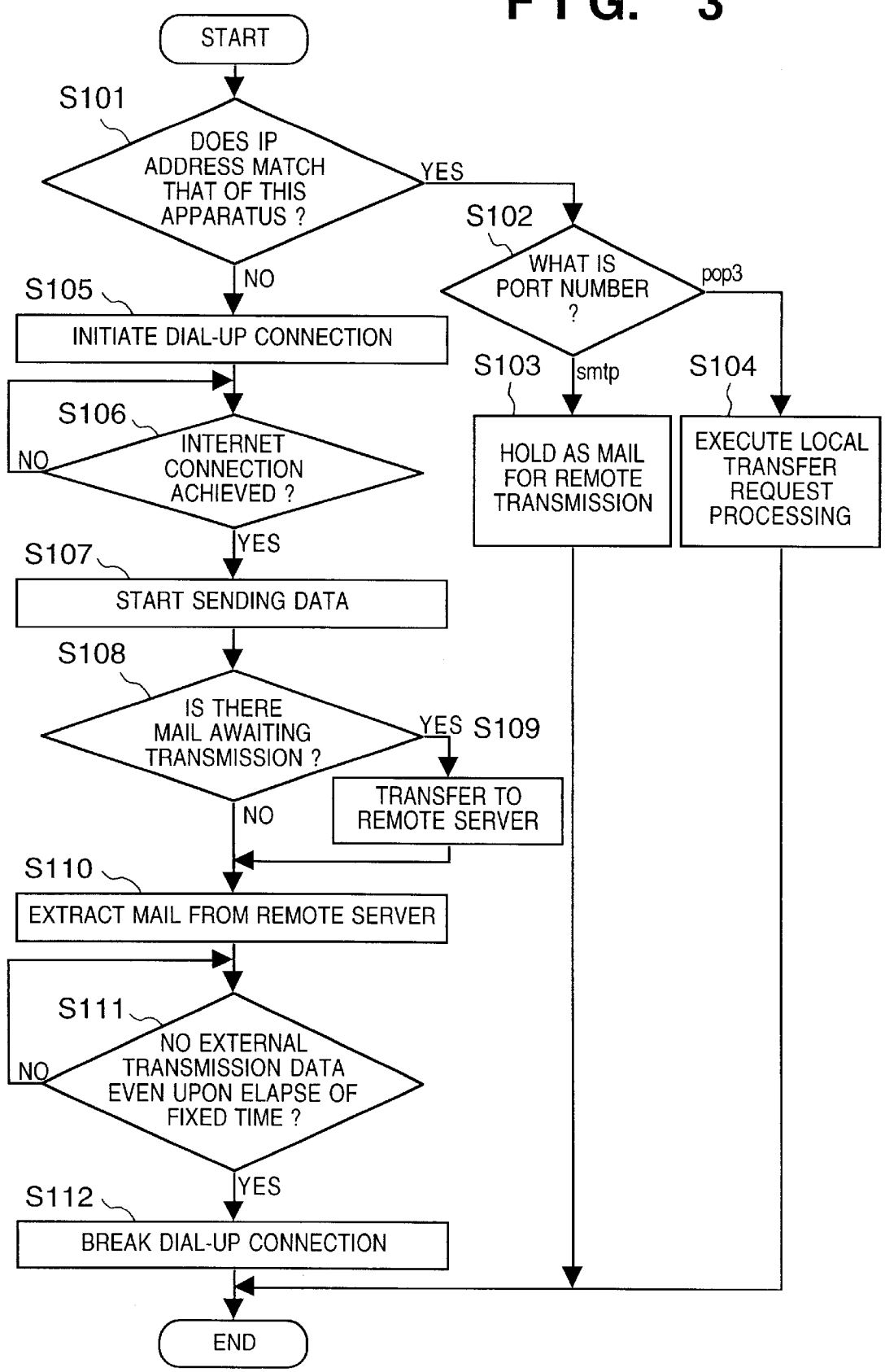
FIG. 3 is a flowchart illustrating an operation for sending and receiving e-mail according to this embodiment.

FIG. 3 is a flowchart showing an operation for sending and receiving e-mail according to this embodiment. When an IP datagram, which is the unit of data transmission on a TCP/IP network, arrives at the TCP/IP controller 212 from the personal computer 102 or workstation 103 on the LAN 104 via the LAN interface 209, the TCP/IP controller 212 establishes a route based upon IP header information of this IP datagram at step S101. More specifically, the TCP/IP controller 212 determines whether a destination IP address in the IP header information coincides with the IP address of the personal computer 102 or workstation 103 on the LAN (local LAN) connected to the image communication apparatus 101. If the two coincide, control proceeds to step S102, at which reference is made to the TCP header to judge, based upon its port number, whether a transfer is to be made to the SMTP server 205 or POP3 server 207. It should be noted that content transferred to the SMTP server 205 is transmission mail data and content transferred to the POP3 server 207 is a request to transfer received mail.

If the decision rendered at step S102 is transfer to the SMTP server 205, control proceeds to step S103, at which the above-mentioned IP datagram is transferred to the e-mail holding unit 204 and is held there temporarily as mail data for transmission. If the decision rendered at step S102 is transfer to the POP3 server 207, control proceeds to step S104. Here, based upon the received-mail transfer request that has been transferred, the received mail is extracted from the e-mail holding unit 204 and then transferred to the personal computer 102 or workstation 103 that issued the request.

If it is found at step S101 the destination IP address contained in the IP header information is not the IP address of the personal computer 102 or workstation 103 on the LAN (the local LAN) connected to the image communication apparatus 101, control proceeds to step S105, at which a dial-up connection is initiated. More specifically, the above-mentioned IP datagram is transferred to the dial-up controller 211, which proceeds to initiate a connection to the dial-up server 106 of the Internet service provider or the like by means for the public network interface 210 via the public network 105. When it is found at step S106 that the connection to the Internet has been achieved, control proceeds to step S107. Here the IP datagram is formed into frames in accordance with the HDLC (High-Level Data Link Control) control procedure and transmission of the resulting IP datagram from the public network interface 210 to the dial-up server 106 begins.

If e-mail waiting to be transmitted is being held in the e-mail holding unit 204 ("YES" at step S108), control proceeds to step S109, where a connection is made to the pre-established external mail server 107 via the public network interface 210 and the SMTP client 206 uses SMTP to request the mail server 107 for transmission of this e-mail. In response, the mail server 107 analyses the destination of this e-mail and delivers this e-mail to the mail server on the receiving side. The mail server on the receiving side then saves the delivered e-mail in a mail box.

Further, the POP3 client 208 is similarly connected to the external mail server 107 via the public network interface 210, uses POP3 to read e-mail having the pre-established account address out of the mail box and stores the e-mail in the e-mail holding unit 204 as received mail (step S110). The received mail that has been stored in the e-mail holding unit 204 is then forwarded to each of the terminals of the local LAN by management performed by the POP3 server 207.

If arrival of an IP datagram having an external address is not sensed by the TCP/IP controller 212 upon elapse of a fixed period of time ("YES" at step S111), the dial-up controller 211 executes processing to break the connection to the dial-up server 106 and the connection is broken by the public network interface 210 (step S112).

In accordance with this embodiment, e-mail to be transmitted to the outside from a terminal on the local LAN is accumulated temporarily within the apparatus. Then, when a dial-up connection is made from a public network for the purpose of establishing a connection to a WWW server or the like on the Internet, advantage is taken of this opportunity to send and receive e-mail in one batch, thereby making it possible to use the public network efficiently and to provide greater economy.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the invention is applicable also to a case where the object of the invention is attained by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiment.

Thus, in accordance with the embodiment as described above, e-mail is stored and forwarded when a connected to the Internet is made via a network, thereby making it possible to improve the efficiency of network utilization.

As many apparently widely different embodiments of the present invention can be made without departing from the spirit and scope thereof, it is to be understood that the invention is not limited to the specific embodiments thereof except as defined in the appended claims.

For example, the timing that stores and forwards e-mail by making a dial-up connection is set every day in the same time or every predetermined cycle. Alternatively, an interval of the cycle is changed by the date of the week or time band. Thereby, it is possible to reduce delay when a plurality of mails would be stored and forwarded.

In addition, priority of e-mail may be set in advance, and a mail of high priority or emergency may be stored and forwarded by making a dial-up connection. Thus, it is possible to prevent such mail from being delayed.

What is claimed is:

1. A communication apparatus for making a dial-up connection to the Internet via a network to provide a client with e-mail and to enable viewing of World-Wide Web pages on the Internet, said apparatus comprising:

interface means for connecting a plurality of clients;

dial-up connection means for making a dial-up connection to the Internet;

detection means for detecting a priority of e-mail; and e-mail processing means for, in a case where the priority of the e-mail is a high priority, making a dial-up connection to transmit the e-mail immediately, and, in a case where the priority of the e-mail is not a high priority, storing the e-mail until a dial-up connection is made by said dial-up connection means, not for transmitting the e-mail, and transmitting the stored e-mail and receiving e-mail when a dial-up connection has been made.

2. The apparatus according to claim 1, wherein said e-mail processing means transmits the e-mail that is not of a high priority by taking advantage of a dial-up connection made to the Internet by said dial-up connection means for a purpose of viewing a World-Wide Web page.

3. The apparatus according to claim 1, wherein said e-mail processing means transmits e-mail from the client to a mail server on the Internet by SMTP.

4. The apparatus according to claim 1, wherein said e-mail processing means receives e-mail to the client from a mail server on the Internet by POP3.

5. A communication method using a communication apparatus for making a dial-up connection to the Internet via a network to provide a client with e-mail and to enable viewing of World-Wide Web pages on the Internet, said method comprising the steps of:

detecting a priority of e-mail;

in a case where the priority of the e-mail is a high priority, making a dial-up connection and transmitting the e-mail immediately, and, in a case where the priority of the e-mail is not a high priority, transmitting the e-mail to a mail server on the Internet in a case where the e-mail is waiting to be transmitted from the client when a dial-up connection has been made to the Internet, not for transmitting the e-mail; and in a case where a priority of e-mail is a high priority, making a dial-up connection to receive the e-mail immediately, and forwarding the received e-mail to the client, and, in a case where the priority of the e-mail is not a high priority, receiving the e-mail from a mail server on the Internet when a dial-up connection has been made to the Internet, not for receiving the e-mail, and forwarding the received e-mail to the client.

6. The method according to claim 5, wherein the e-mail that is not of a high priority is stored and forwarded by taking advantage of a dial-up connection made to the Internet to view a World-Wide Web page.

7. The method according to claim 5, wherein transmission of the e-mail is performed by SMTP.

8. The method according to claim 5, wherein reception of the e-mail is performed by POP3.

9. A computer-readable storage medium storing a program for implementing a communication processing method, the program comprising:

code for a detection step of detecting a priority of e-mail;

code of a transmission step of, in a case where the priority of the e-mail is a high priority, making a dial-up connection and transmitting the e-mail immediately, and, in a case where the priority of the e-mail is not a high priority, transmitting the e-mail to a mail server on the Internet in a case where the e-mail is waiting to be transmitted from a client when a dial-up connection has been made to the Internet via a network, not for transmitting the e-mail; and code of a reception step of, in a case where a priority of e-mail is a high priority, making a dial-up connection to receive the e-mail immediately, and forwarding the received e-mail to the client, and, in a case where the priority of the e-mail is not a high priority, receiving the e-mail from a mail server on the Internet when a dial-up connection has been made to the Internet, not for receiving e-mail, and forwarding the received e-mail to the client.

* * * * *

UNITED STATES PATENT AND TRADEMARK OFFICE
CERTIFICATE OF CORRECTION

PATENT NO.      : 6,499,055 B1
DATED           : December 24, 2002
INVENTOR(S)     : Shoichi Yamaguchi It is certified that error appears in the above-identified patent and that said Letters Patent is hereby corrected as shown below:

<u>Title page,</u>
Insert: -- [*] Notice:  This patent issued on a continued prosecution application filed under 37 CFR 1.53(d), and is subject to the twenty year patent term provisions of 35 U.S.C. 1.54(a)(2). --.

Item [56], References Cited, U.S. PATENT DOCUMENTS, "6,199,106 B1", reference, "Shaw" should read -- Shaw et al. --.

<u>Column 4,</u>
Line 51, "connected" should read -- connection --.

Signed and Sealed this

Ninth Day of December, 2003

JAMES E. ROGAN
*Director of the United States Patent and Trademark Office*